(12) United States Patent
Berenbaum et al.

(10) Patent No.: US 11,440,647 B2
(45) Date of Patent: Sep. 13, 2022

(54) CONFIGURABLE ROTARY ENCODER INCLUDING TWO POINT INFLIGHT AUTO CALIBRATION AND ERROR ADJUSTMENT

(71) Applicant: Simmonds Precision Products, Inc., Vergennes, VT (US)

(72) Inventors: Arthur M. Berenbaum, Middlebury, VT (US); Rajendra S. Kekan, Maharashtra (IN); Sanat Kumar Choudhury, Karnataka (IN); Rohin Hilloowala, Mississauga (CA)

(73) Assignee: SIMMONDS PRECISION PRODUCTS, INC., Vergennes, VT (US)

( * ) Notice: Subject to any disclaimer, the term of this patent is extended or adjusted under 35 U.S.C. 154(b) by 612 days.

(21) Appl. No.: 16/393,019

(22) Filed: Apr. 24, 2019

(65) Prior Publication Data
US 2020/0108917 A1     Apr. 9, 2020

(30) Foreign Application Priority Data

Oct. 5, 2018    (IN) .............................. 201811037756

(51) Int. Cl.
*B64C 25/62*       (2006.01)
*B64F 5/60*        (2017.01)

(52) U.S. Cl.
CPC .............. *B64C 25/62* (2013.01); *B64F 5/60* (2017.01)

(58) Field of Classification Search
CPC .................................................. B64C 25/62
See application file for complete search history.

(56) References Cited

U.S. PATENT DOCUMENTS

| 2,921,759 | A | * | 1/1960 | Elkin | ...................... B64C 25/12 244/102 R |
| 8,136,755 | B2 | | 3/2012 | Hadley et al. | |
| 9,499,280 | B2 | | 11/2016 | Mellor | |
| 11,104,450 | B2 | * | 8/2021 | Stein | ...................... F16F 9/3264 |
| 2006/0284008 | A1 | | 12/2006 | Nance | |
| 2012/0132742 | A1 | | 5/2012 | O'Connell | |
| 2012/0211600 | A1 | * | 8/2012 | Mellor | ...................... B64C 25/00 244/1 OOR |

(Continued)

OTHER PUBLICATIONS

Lars E. Bengtsson, "Lookup Table Optimization for Sensor Linearization in Small Embedded Systems", 2012, Journal of Sensor Technology, 2012, 2, 177-184 http://dx.doi.org/10.4236/jst.2012.24025 Published Online Dec. 2012 (http://www.SciRP.org/journal/jst) (Year: 2012).*

(Continued)

*Primary Examiner* — Elaine Gort
*Assistant Examiner* — Tarek Elarabi
(74) *Attorney, Agent, or Firm* — Cantor Colburn LLP

(57) ABSTRACT

A landing gear system includes a landing gear collar and a strut assembly supported by the landing gear collar. The strut assembly includes a piston that is adjustable between a fully extended position and a fully compress position. The landing gear system further includes a rotary encoder and a controller. The rotary encoder rotates in response adjusting the piston and to outputs a data value in response to its rotation. The controller is in signal communication with the rotary encoder and determines a stroke of the piston based on the data value output from the rotary encoder.

11 Claims, 6 Drawing Sheets

(56) References Cited

U.S. PATENT DOCUMENTS

2014/0176037 A1   6/2014  Yoshimuta
2016/0298316 A1   10/2016 Iwamura et al.
2019/0344904 A1*  11/2019 Stein .......................... F16F 9/10

OTHER PUBLICATIONS

Search Report issued in European Application No. 19201748.1; Application Filing Date Oct. 7, 2019; dated Feb. 24, 2020 (7 pages).

* cited by examiner

CONFIGURABLE ROTARY ENCODER INCLUDING TWO POINT INFLIGHT AUTO CALIBRATION AND ERROR ADJUSTMENT

CROSS-REFERENCE TO RELATED APPLICATIONS

This application claims the benefit of Indian Application No. 201811037756 filed Oct. 5, 2018, which is incorporated herein by reference in its entirety.

BACKGROUND

Exemplary embodiments pertain to the art of aircraft systems, and more particularly, to aircraft landing gear systems.

Aircraft landing gear systems typically include a moveable strut assembly, which includes a piston that slides between a fully extended position and a fully compressed position. The distance from the fully extended position to one or more compressed positions is typically referred to as the "piston stroke". In some aircraft landing systems piston is pivotably coupled to a tilting wheel assembly. As the piston slides between the fully extended position and the fully compressed position, the wheel assembly is adjusted from a fully tilted position (e.g., angled with respect to the ground surface) used to stow the wheels in the wheel well, for example, to a less-tilted landing position (e.g. parallel with respect to the ground surface). Accordingly, the stroke of the piston can be used as feedback control information for adjusting the wheel assembly into the correct desired position.

Conventional Aircraft landing gear systems employ a linear variable differential transformer (LVDT) to measure the stroke. The LVDT is an electromechanical device with one primary coil and two secondary coils. The primary winding is excited by AC signal and the secondary coil voltages are measured. The secondary coil voltages depend on the location of the LVDT armature with respect to its electrical null point. When the armature is located at the electrical null point, the secondary coil voltages are equal. As the LVDT armature moves towards say the first secondary coil, the voltage associated with the first secondary increases, while the voltage of the remaining secondary coil decreases. In this manner, the secondary coil voltages can be utilized to compute the stroke.

BRIEF DESCRIPTION

Disclosed is a landing gear system that includes a landing gear collar and a strut assembly supported by the landing gear collar. The strut assembly includes a piston that is adjustable between a fully extended position and a fully compress position. The landing gear system further includes a rotary encoder and a controller. The rotary encoder rotates in response to adjusting the piston and to outputs a data value in response to its rotation. The controller is in signal communication with the rotary encoder and determines a stroke of the piston based on the data value output from the rotary encoder.

Also disclosed is a method of determining a stroke of a piston. The method comprises adjusting a piston included in a strut assembly between a fully extended position and a fully compress position, and rotating a rotary encoder in response to adjusting the piston. The method further comprises outputting a data value from the rotating encoder in response to rotating the rotary encoder, and determining, via a controller, the stroke of the piston based on the data value output from the rotary encoder.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

Although the LVDT currently implemented in landing gear systems can determine the stroke associated with the strut assembly, the computed stroke measurement can suffer from inaccuracies. Electromagnetic fields, for example, can manipulate the voltages across the primary and/or secondary coils causing erroneous voltage measurements. The LVDT requires excessive mechanical components to facilitate connection of the LVDT to the sliding piston. For example, the LVDT requires mechanical rigging to precisely locate the LVDT null point with reference to the fully extended portion of the piston. These additional mechanical components can wear over time, thereby introducing further errors into the measured stroke.

Various non-limiting embodiments described herein replaces the LVDT with a configurable rotary encoder capable of improving the accuracy of the measured stroke. The rotary encoder also omits the excessive mechanical components utilized by the LDVT, thereby improving long-term durability. Instead of utilizing a LDVT, which requires attaching a separate armature to the sliding piston, the rotary encoder is rotatably coupled to an upper torque link pin of the strut assembly and rotates in response to the sliding motion of the piston. As the piston is displaced, the torque link pin rotates thereby realizing a rotational angular displacement. A relationship between the rotational angular displacement and the displacement of the piston can be determined, which in turn can be used to determine the stroke of the piston without being susceptible to electromagnetic field interruptions.

In addition, the output of the rotary encoder can be calibrated following its initial installation. Once calibrated, subsequent errors in the output measurements can be dynamically corrected to provide improved stroke measurements that take into consideration errors introduced by mechanical tolerances and variations in component designs. In at least one embodiment, the calibration is preformed according to a two-stage process. For example, a first stage of the calibration process includes manual measurements performed while the aircraft is grounded following the initial installation of the rotary encoder. A second stage of the calibration process occurs while the aircraft realizes pressure changes during its first flight following installation of the rotary encoder.

Figure 1:
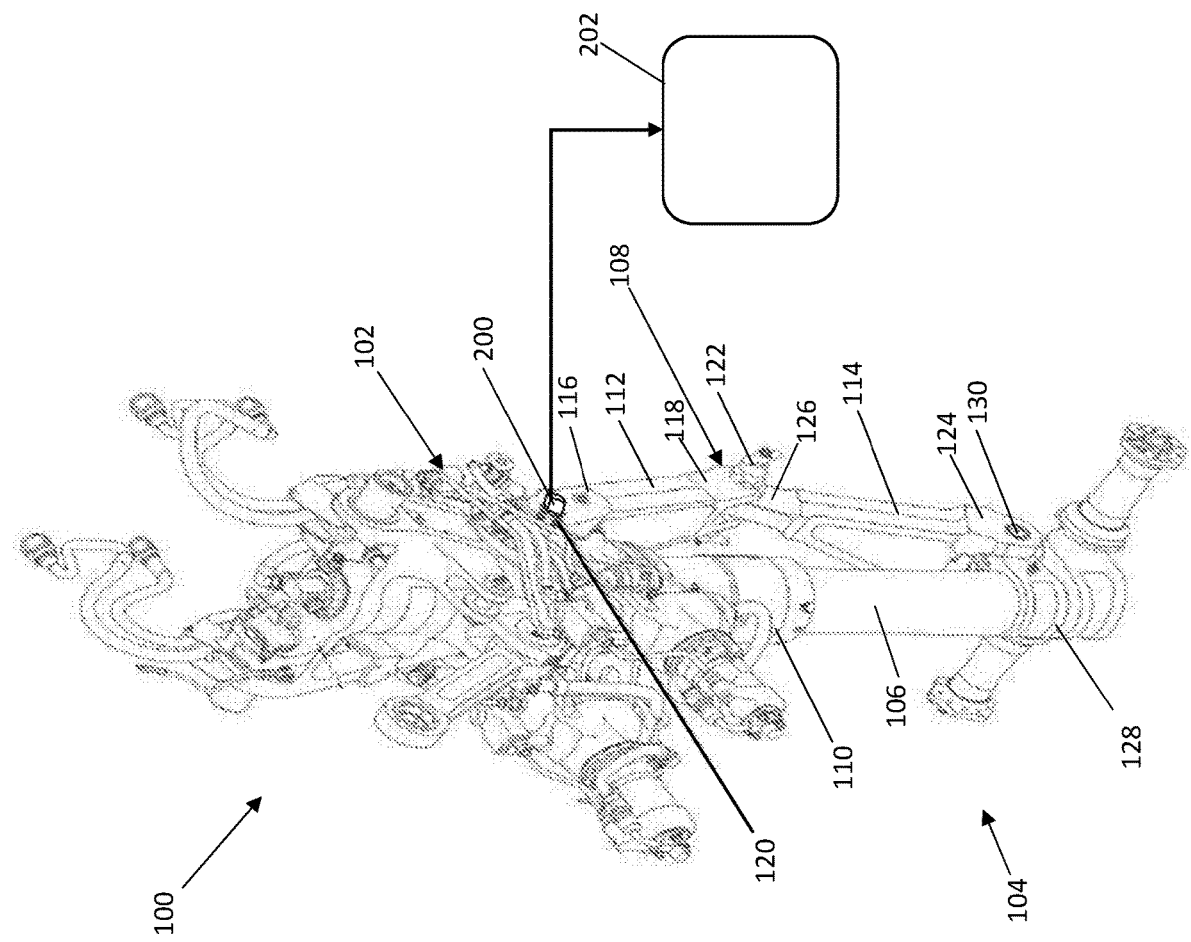
FIG. 1 is a perspective view of a landing gear system according to a non-limiting embodiment.

With reference now to FIG. 1, a landing gear system 100 is illustrated according to a non-limiting embodiment. The landing gear system 100 includes a landing gear collar 102 and a strut assembly 104. The strut assembly 104 includes a piston 106 moveably coupled to a strut linkage 108. The piston 106 slides vertically within a strut cylinder 110 included with the landing gear collar 102, which allows the piston 106 to be displaced between a fully extended position and a fully compressed position.

The strut linkage 108 includes an upper torque link 112 and a lower torque link 114. The upper torque link 112 extends from a first upper link end 116 to a second upper link end 118. The first upper link end 116 is pivotably coupled to the landing gear collar 102 (e.g., the strut cylinder 110) via an upper link pin 120. The lower link end 118 is pivotably coupled to a torque link apex pin 122.

The lower torque link 114 extends from a first lower link end 124 to a second lower link end 126. The first lower link end 124 is pivotably coupled to a piston bracket 128 attached to the piston 106 via a lower link pin 130. The second lower link end 126 is pivotably coupled in common with the second upper link end 118 via the torque link apex pin 122.

The piston 106 and strut linkage 108 can further be coupled to a wheel positioning system (not shown), which adjusts a tilting position of the wheel assembly. The wheel positioning system includes several additional links that are adjusted in response to adjusting the piston 106 and the strut linkage 108. For example, sliding the piston 106 between the fully extended position and the fully compressed position causes adjustment of the strut linkage 108. The movement of the strut linkage 108 causes adjustment of the wheel position system, which in turn adjusts the tiling position of the wheel assembly.

Still referring to FIG. 1, the landing gear system 100 further includes a rotary encoder 200 in signal communication with a controller 202. The rotary encoder 200 is rotatably coupled to the upper link pin 120. Accordingly, the rotary encoder 200 rotates in response to pivoting the first upper link end 116 with the upper link pin 120. For example, the first upper link end 116 pivots with the torque link pin about a center of rotation in response to displacing the piston 106 either upwards or downwards. Accordingly, the angular displacement with respect to the axis of the piston 106 changes based on the geometry of the linkage 108.

The rotary encoder 200 undergoes the same angular displacement as the upper torque link 112. This arrangement allows the rotary encoder 200 to operate as a sensor. In response to rotating the upper torque link 112, the rotary sensor 200 outputs a data signal that indicates the angular displacement of the upper torque link 112. The angular displacement of the upper torque link 112 is related to the stroke of the piston 106. The controller 202 determines the angular displacement based on the data signal output by the rotary encoder 200, and calculates the stroke of the piston 106. The calculation of the stroke based on the positions of the piston 106, strut linkage 108, and rotary encoder 200 are described in greater detail below.

Figure 2A:
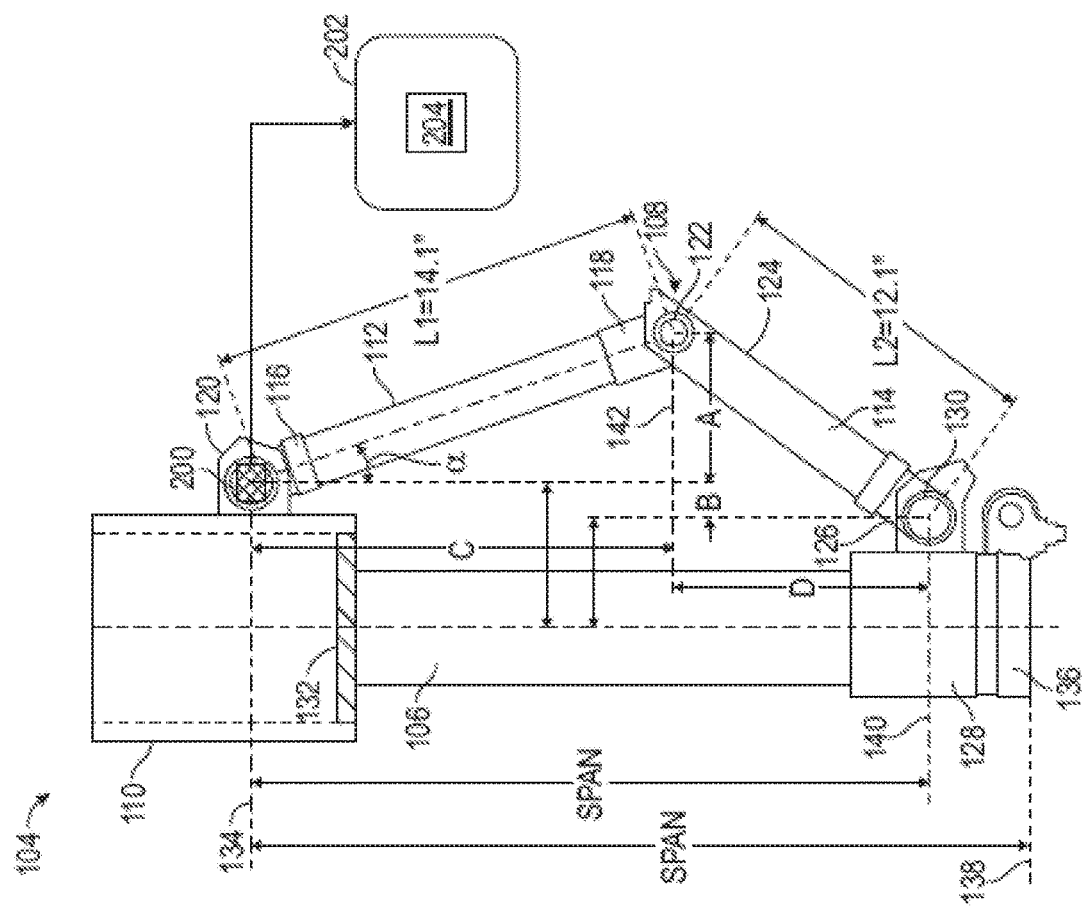
FIG. 2A is a side-view of the landing gear system of FIG. 1 operating in a fully extended position according to a non-limiting embodiment.
Figure 2B:
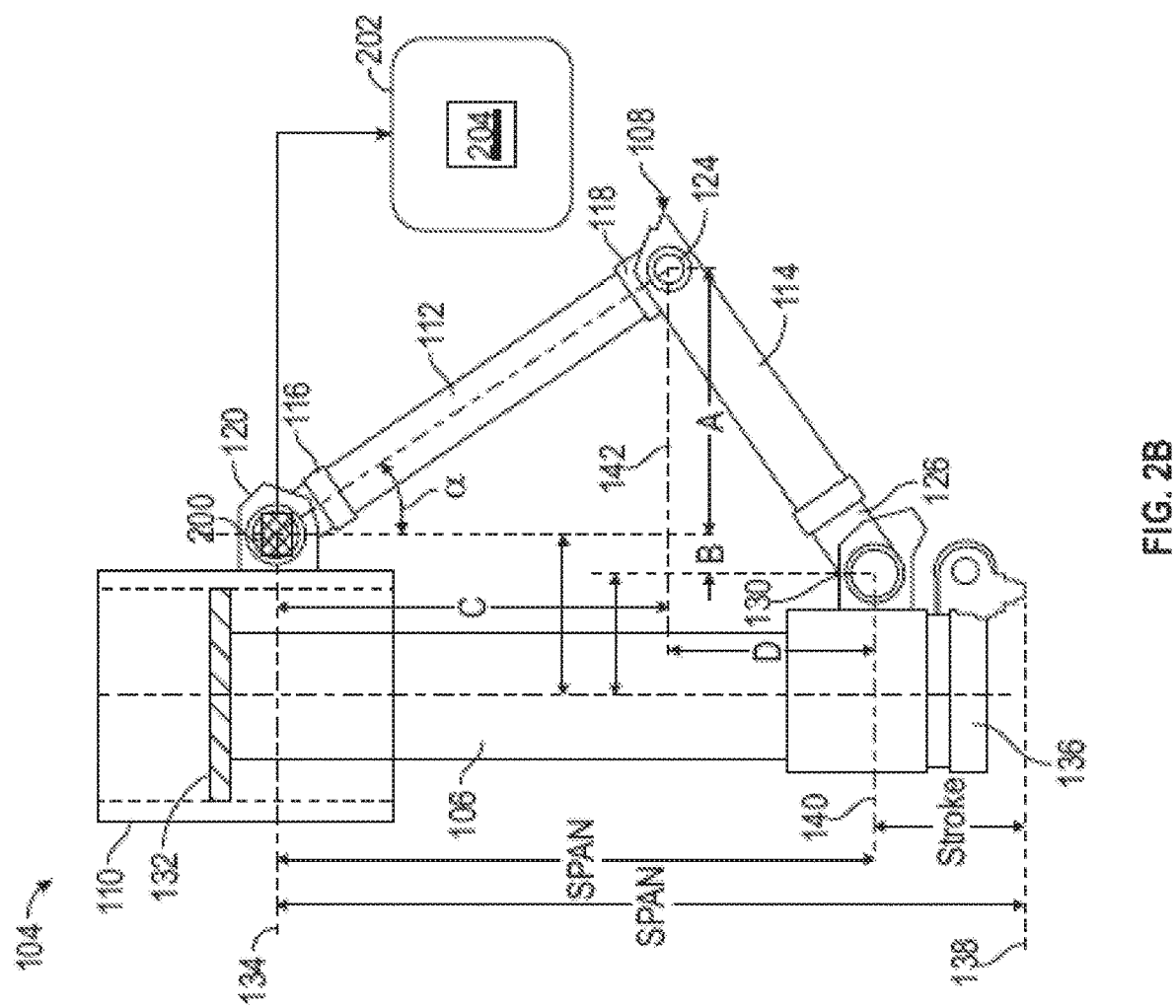
FIG. 2B is a side-view of the landing gear system of FIG. 1 operating in a fully compressed position according to a non-limiting embodiment.

Turning now to FIGS. 2A and 2B, operation of the strut assembly 104 is illustrated in greater detail. FIG. 2A illustrates the strut assembly 104 with the piston 106 residing in the fully extended position. The piston 106 includes an upper end 132 that slides vertically within a strut cylinder 110 included with the landing gear collar (not shown in FIGS. 2A-2B), thereby allowing the piston 106 to be displaced between the fully extended position to the fully compressed position. The upper link pin 120 is aligned with a first axis 134 that extends through the cylinder 110, which is fixed in place. The lower end 136 of the piston 106 is aligned with a second axis 138, which defines the lowest position of the piston 106 when displaced in the fully extended position. The lower link pin 130 is aligned with a third axis 140, which extends through the piston 106 and moves therewith. Accordingly, the second axis 136 moves upwards and downwards with respect to the first axis 134 and the second axis 138. In addition, the perpendicular distance between the upper and lower link pins 120 and 130 is the greatest, when the piston 106 resides in the fully extended position. As the piston 106 is compressed, the span decreases. The change in span can represent the stroke of the piston 106.

The geometrical design of the linkage 108 defines a varying angle (a). The varying angle varying angle (a) defines a changing angle of the upper torque link 112 with respect to a fourth axis 142 that extends through the torque link pin 120 and maintains alignment therewith as the linkage 112 is adjusted. The varying angle (a) can be used to determine stroke of the piston 106 as described in greater detail below.

Turning to FIG. 2B, the piston 106 is shown residing in the fully compressed position. For instance, the piston head 132 is shown being moved upward such that the lower piston end 136 is displaced from the second axis 138. The third axis 140 is also shown as being moved upward. Accordingly, the stroke of the piston 106 can be defined as the distance between the second axis 138 and the adjusted position of the third axis 140.

The varying angle (a) of the linkage is also changed (e.g., increased). For example, as the piston 106 is displaced, the upper torque link 112 is adjusted and the varying angle (a) changes. The rotary encoder 200 coupled to the upper torque link 112 also realizes the same angular displacement as the upper torque link 112. In this manner, the output of the rotary encoder 200 can indicate the angular displacement of the upper torque link 112. A relationship between the angular displacement of the upper torque link 112 and the stroke of the piston 106 can then be defined. Accordingly, the angular displacement of the upper torque link 112 is can be utilized to determine the stroke of the piston 106.

Figure 3:
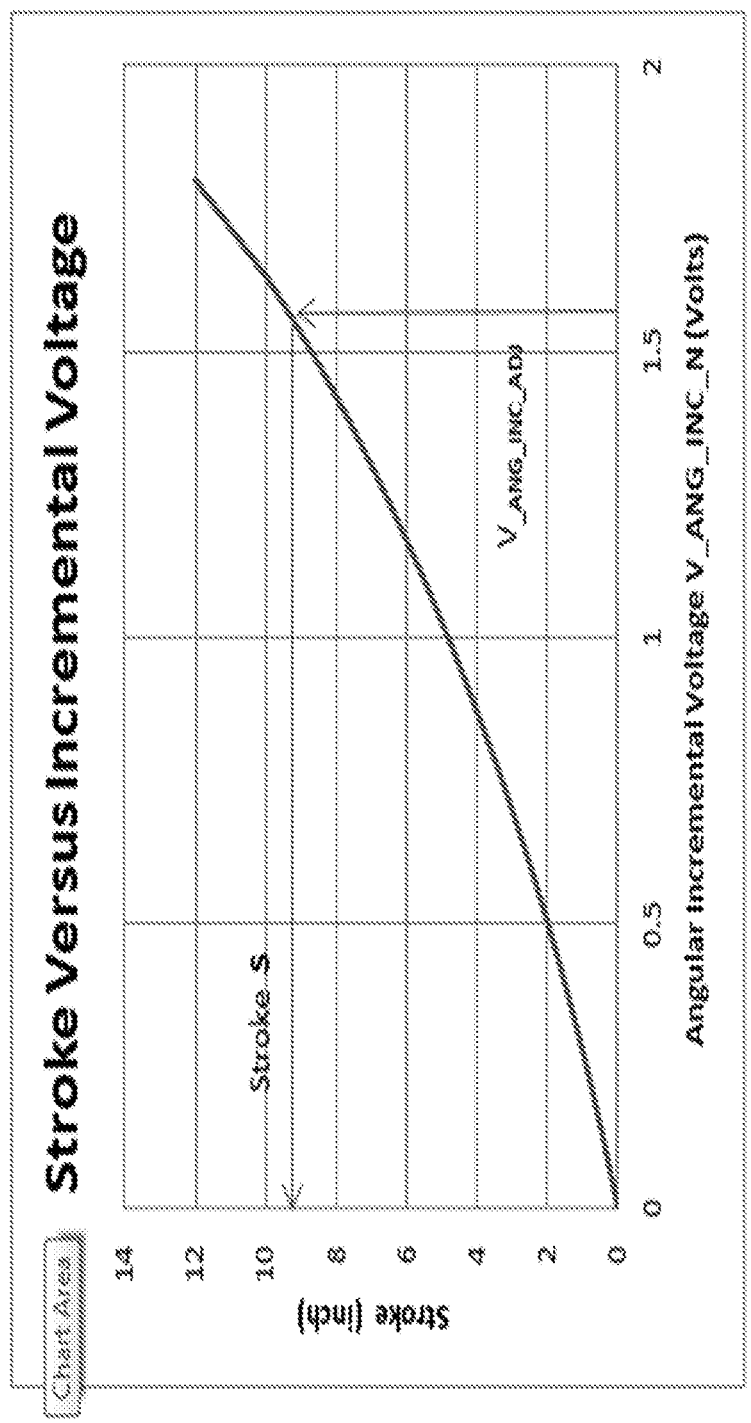
FIG. 3 is a chart illustrating a relationship between the output rotary encoder voltage and a stroke of a piston included in the landing gear system according to a non-limiting embodiment.

FIG. 3, for example, illustrates a relationship between the output of the rotary encoder 200 and the stroke of the piston 106. In at least one embodiment, the angular incremental voltage (V_ANG_INC) output from the rotary encoder 200 can be cross-referenced to corresponding value (Stroke) representing the distance at which the piston is displaced from the second axis 138. This distance is defined as the piston stroke.

In at least one embodiment, the relationship of the angular incremental voltage (V_ANG_INC) and the stroke can be tabulated in a look-up table (LUT) 204, which is stored in the processor 202. The processor 202 can then obtain the output of the rotary encoder 200 and match the angular incremental voltage (V_ANG_INC) to a matching voltage value, which in turn corresponds to the current stroke of the piston 106.

In at least one embodiment, the rotary encoder 200 can undergo a calibration process upon its initial installation. One or more steps of the calibration process can be performed while the aircraft is grounded and upon initial installation of the rotary encoder 200. The calibration then allows for dynamically correcting the angular incremental voltage (V_ANG_INC) during subsequent operation to provide a more accurate piston stroke measurement. For example, after installing the rotary encoder 200, stroke values (S_x) are manually measured over the span of the piston 106, and the corresponding voltage (V_ANG_Sx) output from the voltage encoder 200 for each manually adjusted position is recorded. Once a technician rules that the (Sx) and (V_ANG_Sx) measurements are accurate, the measured values can be stored in the processor 202 for future stroke determination.

In one or more embodiments, a sample set of voltage readings (e.g., 10-20 voltage readings are obtained, and the average of the voltage readings is set as the rotary encoder output voltage (V_ANG_EXT) corresponding to the fully extended position of the piston 106. The rotary encoder voltages (V_ANG_INC_Sx) for each stroke position can then be calculated as:

$$V\_ANG\_INC\_Sx = V\_ANG\_Sx - V\_ANG\_EXT$$

When the aircraft performs the next flight following installation of the rotary encoder 202, pressure readings can be performed while the aircraft is in flight. The recorded parameters are then be stored in non-volatile memory of the controller 202.

As described herein, the controller 200 can apply a correction value (ERR_Sx) to the angular incremental voltage (V_ANG_INC) during subsequent operation to provide a more accurate piston stroke measurement. In at least one embodiment, the controller calculates the correction value (ERR_Sx) based on the following equation:

$$ERR\_Sx = V\_ANG\_INC\_Sx\_N - V\_ANG\_INC\_Sx$$

In at least one embodiment, the calculated parameters Sx, V_ANG_Sx, V_ANG_INC_Sx, ERR_Sx, and V_ANG_EXT are stored in the memory of the controller 202. In at least one embodiment, V_ANG_INC_Sx_N is obtained from the LUT 204 for a given manually measured stroke value.

Following calibration of the rotary encoder 200, the controller 202 can determine the piston stroke during operation of the landing gear system 100. For example, the controller 202 determines the output rotary encoder voltage (V_ANG) and computes the incremental rotary encoder voltage as:

$$V\_ANG\_INC = V\_ANG - V\_ANG\_EXT$$

Once the incremental rotary encoder voltage is computed, the controller 202 computes the corrected angular incremental voltage as:

$$V\_ANG\_INC\_ADJ = V\_ANG\_INC + [(ERR\_Sx / V\_ANG\_INC\_Sx) * V\_ANG\_INC].$$

The controller 202 then compares the corrected angular incremental voltage to the stored angular incremental voltages listed in the LUT 204 to determine the stroke of the piston 106.

Figure 4:
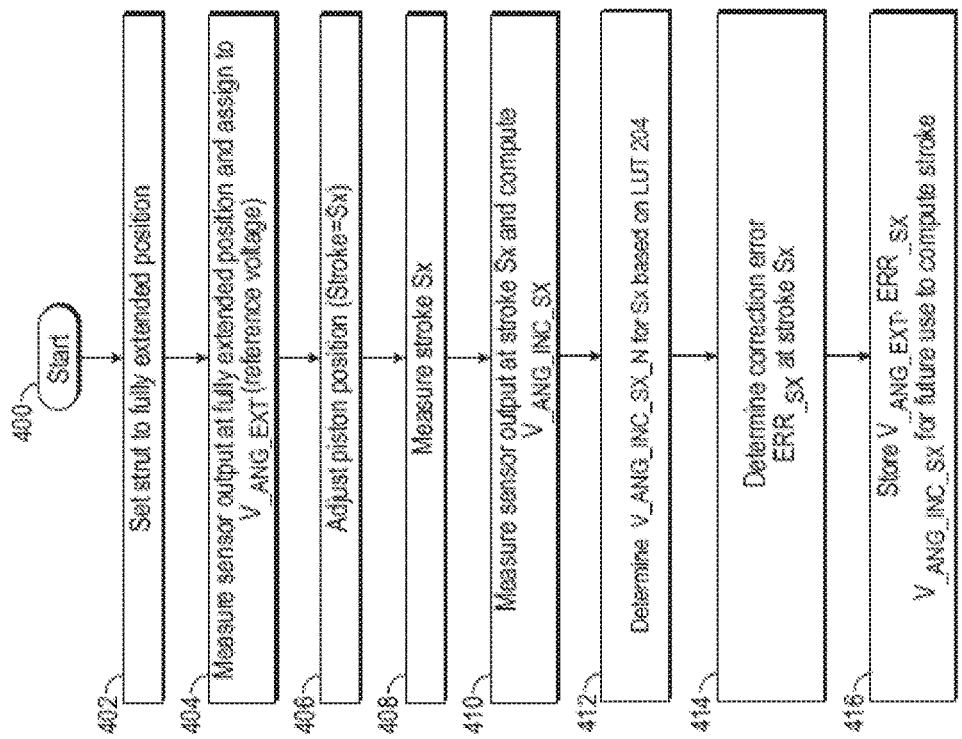
FIG. 4 illustrates a flow diagram depicting a method of calibrating a rotary encoder installed in a landing gear system according to a non-limiting embodiment.

Turning to FIG. 4, for example, a method of calibrating a rotary encoder installed in the landing gear system is illustrated according to a no-limiting embodiment. The method begins at operation 400, and at operation 402 the piston is set to the fully extended position. At operation 404, the output voltage (V_ANG_EXT) of the rotary encoder is measured while the piston resides in the fully extended position. The initial voltage measured when the piston resides in the fully extended position is utilized as a reference voltage to determine future stroke measurements. At operation 406, the piston is displaced from its current position, and at operation 408 the stroke (Sx) is measured based on the displacement of the piston. In at least one embodiment, the stroke is measured as the distance between the current position of the piston and the position of the piston when residing in the fully extended position. At operation 410, the rotary encoder output ( ) is measured for a given stroke (Sx), and V_ANG_INC_Sx is computed. At operation 412, V_ANG_INC_Sx_N is determined for the stroke (Sx) based on the LUT, and at operation 414 the error correction value (ERR_Sx) at the stroke Sx is determined. At operation 416, the incremental rotary encoder voltage (V_ANG_INC_Sx) for the measured stroke position (Sx), the rotary output voltage (V_ANG_EXT) corresponding to the fully extended position of the piston, and the error correction (ERR_Sx) at the stroke position (Sx) are stored in memory to be used to calculate a future stroke of the piston, and the method ends at operation 416.

Figure 5:
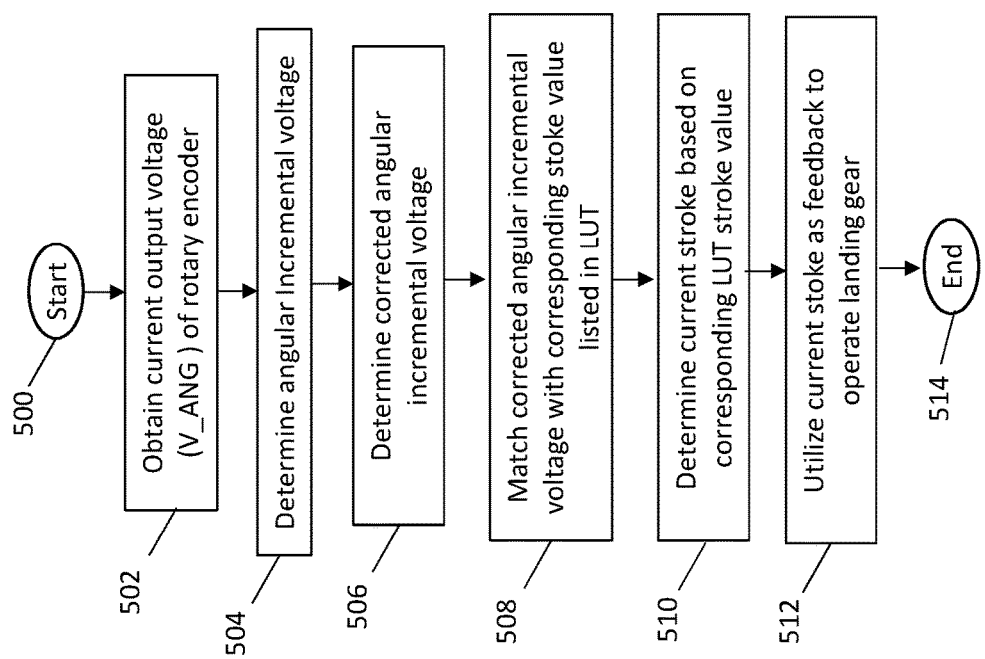
FIG. 5 is a flow diagram illustrating a method of determining a stroke of a piston included in the landing gear system according to a non-limiting embodiment.

Referring to FIG. 5, a method of determining a stroke of a piston included in the landing gear system 100 is illustrated according to a non-limiting embodiment. The method begins at operation 500, and at operation 502 the rotary encoder output (V_ANG) corresponding to the current position of the rotary encoder is obtained. At operation 504, the angular incremental voltage (V_ANG_INC) is determined. At operation 506, the angular incremental voltage is adjusted to generate a corrected angular incremental voltage (V_ANG_INC_ADJ). In at least one embodiment, the corrected angular incremental voltage is using the calibration parameters generated according to the calibration procedure described herein and which are subsequently stored in the memory of the controller. At operation 508, the corrected angular incremental voltage (V_ANG_INC_ADJ) is utilized along with a LUT to determine the current stroke of the piston. For example, the LUT tabulates several angular incremental voltage values that are cross-referenced to a corresponding stroke position value. Accordingly, the corrected angular incremental voltage can be compared to the listing of stored angular incremental voltage values. At operation 510, the current stroke position is determined based on a match between the corrected angular incremental voltage (V_ANG_INC_ADJ) and an angular incremental voltage value listed in the LUT. At operation 512, the current stroke position is provided as a feedback input to the controller. Accordingly, the feedback can be utilized as a feedback value to control the landing gear system (e.g., to move the piston and adjust the tilted position of the wheel assembly), and the method ends at operation 514.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A landing gear system comprises:
   a landing gear collar;
   a strut assembly supported by the landing gear collar, the strut assembly including a piston that is adjustable between a fully extended position and a fully compress position;
   a rotary encoder rotatably coupled to the strut assembly, the rotary encoder configured to rotate in response to adjusting the piston and to output a data value indicative of a voltage level in response to rotating the rotary encoder; and
   a controller in signal communication with the rotary encoder and configured to determine a stroke of the piston based on the data value output from the rotary encoder,
   wherein the controller stores a plurality of pre-determined voltages that are cross-referenced to a respective stroke position of the piston, and determines the stroke based on a comparison between the voltage level and the plurality of pre-determined voltages.

2. The landing gear of claim 1, wherein the strut assembly further comprises a strut linkage configured to adjust in response to adjusting the piston.

3. The landing gear of claim 2 wherein the rotary encoder is coupled to the strut linkage and rotates in response to adjusting the strut linkage.

4. The landing gear of claim 3, wherein the piston is configured to move between a fully extended position and a fully compressed position.

5. The landing gear of claim 1, wherein the controller dynamically adjusts the voltage level based on a correction value, and determines the stroke based on the adjusted voltage level.

6. A method of determining a stroke of a piston, the method comprising:
   storing, in a look-up table of a controller, a plurality of pre-determined voltages that are cross-referenced to a respective stroke position of a piston included in a strut assembly;
   adjusting the piston between a fully extended position and a fully compress position;
   rotating a rotary encoder in response to adjusting the piston; and
   outputting a data value indicative of a voltage level from the rotating encoder in response to rotating the rotary encoder;
   determining, via the controller, the stroke of the piston based on the data value output from the rotary encoder; and
   determining, via the controller, the stroke based on a comparison between the voltage level and the plurality of pre-determined voltages.

7. The method of claim 6, further comprises rotatably coupling the rotary encoder to a strut linkage.

8. The method of claim 7, further comprising outputting the data value in response to adjusting the strut linkage.

9. The method of claim 8, further comprising moving the piston between a fully extended position and a fully compressed position, and determining the data value based on a difference between an adjusted position of the piston and the fully compressed position.

10. The method of claim 6, further comprising:
    determining a correction value;
    storing the correction value in a memory unit; and
    dynamically adjusting, via the controller, the voltage level based on the correction value.

11. The method of claim 10, further comprising determining, via the controller, the stroke based on the adjusted voltage level.

* * * * *